(12) United States Patent
Altenhofer et al.

(10) Patent No.: US 11,117,568 B2
(45) Date of Patent: Sep. 14, 2021

(54) OPERATING METHOD FOR A HYBRID VEHICLE

(71) Applicant: Bayerische Motoren Werke Aktiengesellschaft, Munich (DE)

(72) Inventors: Martin Altenhofer, Munich (DE); Stefan Thum, Planegg (DE); Karl Lorenz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/296,293

(22) Filed: Oct. 18, 2016

(65) Prior Publication Data

US 2017/0036670 A1    Feb. 9, 2017

Related U.S. Application Data

(63) Continuation of application No. PCT/EP2015/064317, filed on Jun. 25, 2015.

(30) Foreign Application Priority Data

Jul. 16, 2014  (DE) .................... 10 2014 213 776.4

(51) Int. Cl.
  *B60W 20/15*  (2016.01)
  *B60W 10/06*  (2006.01)
  (Continued)

(52) U.S. Cl.
  CPC ............ *B60W 20/15* (2016.01); *B60W 10/06* (2013.01); *B60W 10/08* (2013.01); *B60W 20/10* (2013.01);
  (Continued)

(58) Field of Classification Search
  None
  See application file for complete search history.

(56) References Cited

U.S. PATENT DOCUMENTS

| 4,520,271 A * | 5/1985 | Goertler | ................... B60S 1/08 |
| | | | 123/179.3 |
| 6,362,536 B1 * | 3/2002 | Izumiura | ................ B60K 6/485 |
| | | | 180/65.26 |

(Continued)

FOREIGN PATENT DOCUMENTS

| CN | 101389518 A | 3/2009 |
| CN | 103237705 A | 8/2013 |

(Continued)

OTHER PUBLICATIONS

International Search Report (PCT/ISA/210) issued in PCT Application No. PCT/EP2015/064317 dated Oct. 16, 2015 with English translation (five pages).

(Continued)

*Primary Examiner* — Lail A Kleinman
(74) *Attorney, Agent, or Firm* — Crowell & Moring LLP

(57) ABSTRACT

An operating method for a hybrid vehicle having at least two drive engines, of which the first drive engine is a combustion engine with internal combustion and can be supplied with fuel from a first energy storage device, and a second drive engine, which can be supplied with energy from a second energy storage device. In order to determine a control command with which the first drive engine can be shut off the method includes determining a state value for the filling degree of the first energy storage device. The method also includes detecting a filling degree of the second energy storage device, and comparing said state value for the filling degree to a target state value. Depending on said comparison, the method also includes determining a control command for the first drive engine.

11 Claims, 1 Drawing Sheet

(51) Int. Cl.
*B60W 10/08* (2006.01)
*B60W 20/10* (2016.01)

(52) U.S. Cl.
CPC . *B60W 2510/244* (2013.01); *B60W 2530/209* (2020.02); *Y02T 10/62* (2013.01); *Y10S 903/906* (2013.01)

(56) References Cited

U.S. PATENT DOCUMENTS

| | | | |
|---|---|---|---|
| 6,615,656 B1* | 9/2003 | Breed | B60J 10/00 |
| | | | 177/136 |
| 10,017,175 B2 | 7/2018 | Saito | |
| 2009/0015201 A1* | 1/2009 | Fukumura | B60K 6/46 |
| | | | 320/130 |
| 2010/0185360 A1 | 7/2010 | Windbergs et al. | |
| 2014/0074335 A1 | 3/2014 | Krauss et al. | |
| 2014/0288747 A1* | 9/2014 | Saito | B60W 20/10 |
| | | | 701/22 |
| 2016/0185337 A1* | 6/2016 | Morita | B60W 10/06 |
| | | | 701/22 |

FOREIGN PATENT DOCUMENTS

| | | |
|---|---|---|
| DE | 198 33 932 A1 | 10/1999 |
| DE | 198 33 932 C2 | 8/2001 |
| DE | 10 2007 030 992 A1 | 1/2009 |
| DE | 10 2008 006 028 A1 | 7/2009 |
| DE | 10 2012 008 254 A1 | 10/2013 |
| DE | 10 2012 108 485 A1 | 3/2014 |
| EP | 1 987 994 A1 | 11/2008 |
| JP | 2009-12593 A | 1/2009 |
| JP | 2013-147057 A | 8/2013 |
| WO | WO 2012/150088 A1 | 11/2012 |
| WO | WO 2013/094557 A1 | 6/2013 |

OTHER PUBLICATIONS

German-language Written Opinion (PCT/ISA/237) issued in PCT Application No. PCT/EP2015/064317 dated Oct. 16, 2015 (four pages).
German Office Action issued in counterpart German Application No. 10 2014 213 776.4 dated May 8, 2015 (seven pages).
Chinese-language Office Action issued in counterpart Chinese Application No. 201580021263.3 dated Aug. 29, 2018 with English translation (11 pages).
Chinese Office Action issued in counterpart Chinese Application No. 201580021263.3 with English Translation (fourteen (14) pages).
German Examination Report issued in counterpart European Application No. 102014213776.4 dated Jun. 30, 2021 five (5) pages.

* cited by examiner

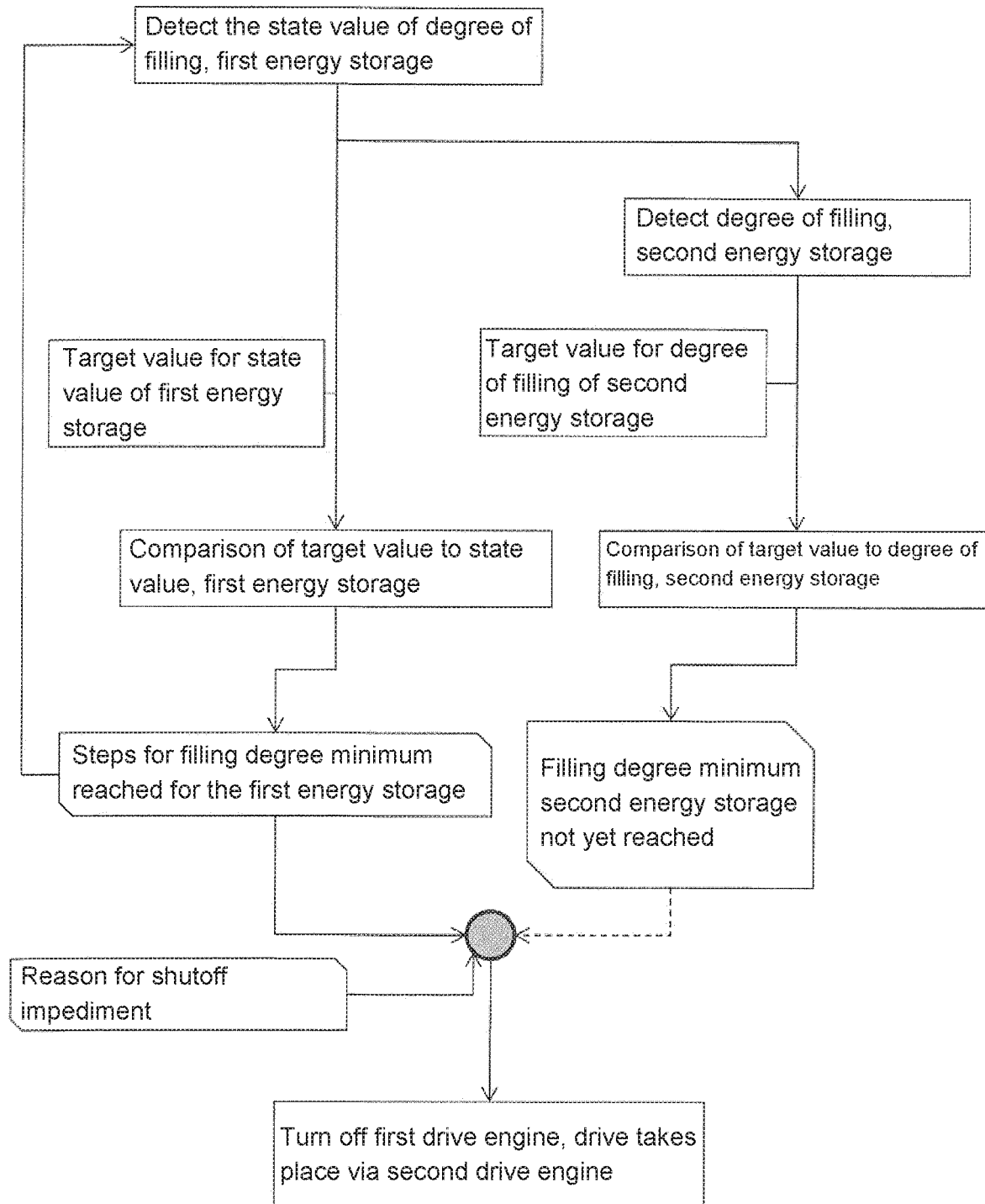

OPERATING METHOD FOR A HYBRID VEHICLE

CROSS REFERENCE TO RELATED APPLICATIONS

This application is a continuation of PCT International Application No. PCT/EP2015/064317, filed Jun. 25, 2015, which claims priority wider 35 U.S.C. § 119 from German Patent Application No. 10 2014 213 776.4, filed Jul. 16, 2014, the entire disclosures of which are herein expressly incorporated by reference.

BACKGROUND AND SUMMARY OF THE INVENTION

The embodiments of the present invention relate to a method for operating a hybrid vehicle.

Hybrid vehicles in terms of the embodiments of the present invention are motor vehicles that are characterized by at least two drive systems. Generally, one of said drive systems is based on a combustion engine and the other on another type of drive engine, often an electrical drive engine. With such vehicles, the synchronization of the two drive systems is of great importance, whether to operate the vehicle as efficiently as possible, or to allow the two systems to interact as discretely as possible without the passengers noticing. Usually, two different energy storage devices are provided in the vehicle for the two drive systems. When developing hybrid vehicles, this often requires a control strategy, in particular for the drive engines and their energy supply, which is at least adapted or varied with respect to conventional motor vehicles operated with combustion engines.

In conventional motor vehicles, which is to say, in motor vehicles having only one drive system based on a combustion engine, a filling level of the fuel tank (energy storage device) is often characterized as a so-called reserve. Once this filling level has been reached, the operator of the vehicle receives a warning notice that the remaining available operating range is now limited. If the vehicle is moved further without refueling in time, the fuel tank will be emptied until no more fuel can be delivered to the combustion engine. Once no more fuel can be delivered, the vehicle comes to a halt; with modern combustion engines, said "driving on empty" often leads to secondary damage in high-stress components, such as the high-pressure fuel pump or in the fuel injectors.

From prior art, methods are known where the combustion engine is turned off after the fuel tank has reached a critical filling degree. DE 198 33 932 A1 discloses a device that shuts off the fuel line and thus turns off the combustion engine if the fuel in the tank drops below a certain filling level.

An object of the embodiments of the invention is to provide an improved operating strategy for hybrid vehicles, in particular in case of a low filling degree of an energy storage device. Such an operating strategy allows continued travel with the vehicle even if no more energy can be taken from one of at least two energy storage devices.

In terms of the embodiments of the invention, a drive engine is understood to be a device that is set up to provide driving power to overcome driving resistances of a motor vehicle. Hybrid vehicles are generally characterized in that they have at least two drive engines; said drive engines are often different in type, as in particular a combustion engine and an electromechanical energy converter. A first drive engine is developed as a combustion engine with internal combustion. Preferably, said combustion engine is developed as a combustion engine in piston design.

In terms of the embodiments of the invention, a second drive engine is understood to be a drive engine which is disposed in the hybrid vehicle in addition to the first drive engine. Preferably, the second drive engine is developed as a hydraulic, preferably pneumatic or especially preferably as an electric drive engine. Furthermore preferably, the second drive engine can also be developed as a combustion engine, which relative to the first drive engine can be operated in particular with a different type of fuel.

In terms of the embodiments of the invention, an energy storage device is understood to be a device for storing and providing energy for the drive engines. A first energy storage device is understood to be a device for storing fuel for the first drive engine. Preferably, [the] energy storage device for the first drive engine is developed as a container or tank. The second energy storage device, which is to say the energy storage device for the second drive engine, is preferably developed as container or tank, preferably as a pressurized container, furthermore preferably as a kinematic storage device, in particular a fly wheel storage device, and especially preferably as an electromechanical energy storage device, in particular an accumulator or a battery.

In terms of the embodiments of the invention, determining the filling degree of the first energy storage device is to be understood such that the filling degree of said energy storage device is determined indirectly or directly. Preferably, the state value can be interpreted as a filling level of the first energy storage device.

Preferably, the filling degree of the first energy storage device is measured to determine the filling degree of the energy storage device; in particular, the filling height of the fuel in said energy storage device is measured, or the mass of the energy storage device is determined. Preferably, the combustion engine, in particular the combustion in the combustion chambers, is monitored; this in particular allows drawing conclusions as to a low filling degree of the energy storage device due to so-called "misfires."

Furthermore, the pressure in a fuel supply system is measured to determine said filling degree. In doing so, the fuel supply system comprises at least one delivery device, in particular a pump for delivering fuel, and one or a plurality of lines, for the specific transport of the fuel to the first drive engine, in particular to the combustion engine or away from said combustion engine. Furthermore preferably, the pressure is measured in a high-pressure section of the fuel supply system. A high-pressure section is understood in particular as a section of said system in which there is a scheduled pressure of preferably more than 10 bar, preferably more than 100 bar, when the combustion engine is in operation.

Furthermore, the filling degree is determined indirectly. Such an indirect determination of the filling degree is preferably based on a comparison of the target delivered volume of fuel and the actual delivered volume. Preferably, to that end, the current uptake and/or the voltage drop on a fuel delivery pump is monitored, and furthermore preferably, the delivered fuel quantity is measured. Furthermore preferably, said values, in particular for current and voltage, or their temporal progress, are compared to target values. Preferably, it is possible to determine the so-called delivery angle of a fuel pump from such a measurement. Furthermore, the delivery angle of the fuel pump changes, in particular in case of a critical or low filling degree; in said case the delivery angle preferably increases.

Furthermore, one and/or one or several additional of the aforementioned parameters is used to determine the filling degree of the first energy storage device. Preferably, the filling level and/or the pressure in the high-pressure system, in particular a so-called rail pressure, and/or the reference value from the target delivery volume and the actual delivery volume, in particular the delivery angle, is used for determining the filling degree in the first energy storage device.

After a comparison with a target value, such a state value for the filling degree of the first energy storage device can describe at least two states for the energy storage device, "sufficient fuel in the energy storage device" or "not enough fuel in the energy storage device."

Detecting the filling degree of the second energy storage device is to be understood as measuring the filling degree of said storage device indirectly or directly. Preferably, detecting the filling degree of the second energy storage device is to be understood as measuring an electrical voltage and/or an electrical current. Furthermore preferably, this is to be understood as measuring the temporal progress of an electrical voltage and/or a current.

In terms of the embodiments of the invention, a target state value is to be understood as a specifiable state value for the filling degree of the energy storage devices, in particular the first energy storage device. Preferably, such as target state value can be determined by way of calculation or simulation, furthermore preferably, such a target state value can be determined experimentally by way of test drives or test bench runs.

In terms of the embodiments of the invention, a control command for the drive engine is to be understood as a control parameter that causes the operation of the first drive engine to be turned off instantly.

The state value for the filling degree of the first energy storage device is determined from a specific group of parameters. Preferably, a tank filling level, which is to day the current content of the first energy storage device, is measured. The tank filling level in particular represents a precise parameter from which the filling degree of the first energy storage device can be derived.

Furthermore, current driving state parameters such as in particular the longitudinal and/or transverse tilt of the vehicle as well as the longitudinal and/or transverse acceleration of the vehicle as well as the speed of the vehicle as well as the ambient temperature and/or the fuel temperature are taken into account when determining the filling degree of the first energy storage device. In particular the aforementioned parameters can lead to a locally varying distribution of a liquid fuel in the first energy storage device. In particular by taking into account the aforementioned parameters, it is possible to determine an especially reliable state value for the filling degree of said energy storage device.

Furthermore, the remaining range determined in the vehicle control is used to determine the state value for the filling degree of the first enemy storage device. In particular, many potential sources or errors have already been removed from said measured and calculated range and it allows a particularly precise determination of such a state value.

At least two, preferably a plurality of state values for the filling degree of the first energy storage device are used to determine that a filling degree minimum of the first energy storage device has been reached or undershot. In particular by using a plurality of state values, an especially safe method is provided.

Preferably, the filling degree of the second energy storage device is also used for the method according to the embodiments of the invention. Furthermore, the filling degree of the second energy storage device influences the determination of the control command for the first drive engine. Furthermore, it is not the absolute filling degree of the second energy storage device that is taken into account in the manner described above, but rather the energy quantity that can be removed from it, in particular without causing any unscheduled direct or indirect damage to the energy storage device. With electrochemical energy storage devices, a deep discharge to filling degree zero or near zero is often not possible or leads to a damage of the energy storage device. In particular with such energy storage devices, only the "removable energy quantity" up to which no indirect or direct damage to the energy storage device must be feared is taken into account.

Preferably, fuel delivery parameters are used to determine the state value for the filling degree of the first energy storage device. Such fuel delivery parameters can be derived preferably at the fuel delivery system with which the first drive engine is supplied from the first energy storage device. These are pressures in said fuel delivery system, preferably the pressure difference before and after the throttle points or preferably a pressure curve over a time period. Furthermore preferably, it is the flow velocity. Furthermore, the acoustics in such a fuel delivery system can be monitored as well. In particular, air bubbles in the delivered fuel lead on the one hand to changed acoustics compared to the fuel delivered without bubbles, and on the other hand indicate a low filling degree in the energy storage device.

Furthermore, temporal or chronological parameters are also taken into account. Such parameters are understood in particular as the time passed since starting travel and/or the distance traveled since starting travel.

Several of the aforementioned parameters may be compared to specifiable target values and the state value for the filling degree of the first energy storage device may be derived therefrom. In particular by employing at least two or more parameters when determining the state value for the filling degree of the first energy storage device, an especially reliable method for shutting off the first drive engine while simultaneously continuing operation with the second drive engine can be represented.

In particular by selecting from the group of aforementioned parameters the parameters used for determining the state value for the filling degree respectively for determining the control command for the first drive engine, a particularly reliable state value for the filling degree and thus a reliable shutoff criterion for the first drive engine can be determined.

The filling degree of the first energy storage device may be determined at least twice or multiple times at time intervals. Determining the filling degree only once may lead to a faulty shutoff of the first drive engine. Such faulty shutoffs can be caused in particular by liquid fuel sloshing back and forth in the energy storage device. To reduce or avoid said faulty shutoffs, the filling degree of the energy storage device is determined multiple times at time intervals. Preferably, a corresponding control command is determined only when at least two or more state values for the filling degree or filling degrees of the first energy storage device derived therefrom advise shutting off the first drive engine.

Several such state values for the filling degree are determined within a specifiable time period. Said time period is longer than 0.1 seconds, preferably longer than 5 seconds and especially preferably longer than 30 seconds, and preferably, said time period is shorter than 300 seconds, preferably shorter than 150 seconds and especially shorter than 60 seconds. In particular by determining a plurality of state values, unnecessary shutoffs of the combustion engine can be reduced and therefore an improved operating method is provided. In doing so, the aforementioned range on the one hand represents a sufficient time period to reduce the faulty shutoffs, and on the other hand is short enough to avoid damages due to "dry runs."

So-called priority parameters may be determined, which prevent or delay a shutoff of the combustion engine. Such priority parameters are selected from a certain group of parameters which includes at least the following parameters: driving requirements; and taking into account at least one additional vehicle control parameter, I particular prioritized shutoff impediment reasons.

Said priority parameters can be understood as shutoff impediment reasons. Such shutoff impediment reasons are in particular to prevent a safety-critical shutoff or a shutoff of the first drive engine that leads to damages.

Shutoff impediment reasons can also be specified by the driver.

Furthermore, the driving requirements are taken into account in the determination of the priority parameter. Current driving requirements such as preferably a position of the accelerator pedal or a gradient of the movement of the accelerator pedal are taken into account. Furthermore, future driving requirements are taken into account, such as those accessible from a route calculation. In particular, the shutoff of the first drive engine can be prevented or delayed if the position of the accelerator pedal is close to its 100% position. Preferably, close to 100% is to be understood as a range of preferably greater than 60%, preferably greater than 80% and especially greater than 90%. Furthermore, a shutoff of the combustion engine can be prevented if a kick-down acceleration is obvious from the gradient of the accelerator pedal operation.

Furthermore, information from driver assistance systems is taken into account as well in the determination of the driving requirements. Driving requirements can be specified via driver assistance systems; a driving request is generated via the programming of a speed control system. Driving requirements that result from distance warning- and/or stop systems are taken into account in the determination of prioritized shutoff impediment reasons. Figuratively speaking, a high acceleration request and thus a prioritized shutoff impediment reason may result from the fact that in the speed control system, a specific distance to a preceding vehicle is set/programmed with distance sensors, with the preceding vehicle accelerating strongly. Such an acceleration requirement thus results from the driver assistance system without the driver actuating the acceleration pedal, but according to the embodiments of the invention, this can be taken into account as well.

Furthermore, shutoff impediment reasons are taken into account when determining the priority parameter. Such impediment reasons may result from superimposed operating strategies for the first drive engine, preferably from the start-stop operating strategy, preferably from one or a plurality of operating temperatures of the first drive engine.

Furthermore, the control command can be influenced with a priority parameter only for a limited time. The first drive engine is nevertheless shut off when the priority parameter is permanently present. Permanently is to be understood as a time period that is preferably greater than 10 seconds, preferably greater than 30 seconds and especially greater than 300 seconds and furthermore smaller than 500 seconds, preferably smaller than 200 seconds and especially smaller than 90 seconds.

In particular the priority parameter can prevent that the first drive engine is shut off during a passing maneuver (position of acceleration pedal near 100%).

The shutoff may be displayed to the driver preferably haptically, preferably acoustically and especially preferably optically. Furthermore, the display occurs with a combination of at least two of the aforementioned display modes.

The filling degree of the first energy storage device is stored in a non-volatile data memory. In doing so, a non-volatile data memory in terms of the embodiments of the invention is to be understood as a data memory that retains the stored information even during and after the vehicle has been shut off, preferably a disk drive, or a solid state drive. In the starting process, a certain time period passes until the actual filling degree of the first energy storage device has been determined. Thus, this may lead in particular to a case where the combustion engine (first drive engine) is started although before shutting off the motor vehicle, a control command for shutting off said drive engine was determined because the filling degree of the first energy storage device is too low. The too low filling degree or the command for shutting off the combustion engine is stored in the non-volatile memory device and said command is made available for some time to the control system of the motor vehicle, preferably in a prioritized manner, and thus a starting of the combustion engine after "empty run" and shutoff is prevented.

Sometime is to be understood as a time period that is greater than 1 millisecond (ms), preferably greater than 50 ms and preferably greater than 100 ms and furthermore, said time period is smaller than 2000 ms, preferably smaller than 1500 ms and especially smaller than 100 ms, especially preferably, the time period is at least about 500 ms.

In particular, because the stored state of the energy storage device is available/prioritized for only a limited time period, it is ensured that on the one hand, after a "tank empty run", the combustion engine is not started when the motor vehicle is started again although the filling degree of the first energy storage device is still too low for this. However, because after some time, the actual filling degree of the first energy storage device has been determined and made available again to the vehicle control system, it is ensured that the first drive engine can be started in the case that the vehicle was refueled during the standstill and the combustion engine can be started. In doing so, the time interval must be rated in particular such that said process occurs without the passengers noticing and thus an improved method for controlling the motor vehicle is provided.

Other objects, advantages and novel features of the embodiments of the present invention will become apparent from the following detailed description of one or more preferred embodiments when considered in conjunction with the accompanying drawing, in which:

BRIEF DESCRIPTION OF THE DRAWING

FIG. 1 is a diagram for an operating method according to an embodiment of the invention.

DETAILED DESCRIPTION OF THE DRAWING

FIG. 1 shows a partially simplified diagram for a method according to the embodiments of the invention for operating a hybrid vehicle. With such a method, first the state value for the filling degree of the first energy storage is determined. It has been shown that the stability of the method can be increased if a combination of several parameters is taken into consideration. The filling level of the tank, as well as the pressure in the high-pressure system of the fuel delivery device can be controlled. Only if the filling level of the tank falls below a specifiable minimum (target value for state value) and the so-called "rail pressure" in the high-pressure system also falls below a specifiable threshold value (further target value for state value), the filling degree for the energy storage device is probably low. When comparing the target value(s) and the state value(s) for the filling degree, it is determined whether the minimum filling degree for the first energy storage is already being reached.

Likewise, the filling degree for the second energy storage device is measured and compared to a target value. In case of an electrochemical energy storage, it is checked whether electrical energy can still be removed from said accumulator for driving the motor vehicle. Whether or not this filling degree is taken into account is purely optional and the connecting line to the junction is therefore represented as a dashed line.

If the filling degree for the first energy storage is low, figuratively speaking, "tank empty", and there is still sufficient energy available in the second energy storage for further driving of the motor vehicle, a control command can be issued to shut off the combustion engine and for driving the motor vehicle solely by means of the second drive engine, in particular the electric motor.

It may be possible to take shutoff impediment reasons into consideration. Although this criterion is also optional, as shown earlier with respect to the second energy storage device, it has been shown, however, that an improvement of the stability of the method can be achieved with this criterion and therefore the connecting line to the junction is represented as a solid line.

For example, a full load acceleration (kick-down) set for a brief time indicates that the combustion engine is not to be shut off. Possibly, the vehicle is currently in a passing situation in such a case, and shutting off the combustion engine and the ensuing deterioration of the acceleration potential would be critical to safety. Only if there is no shutoff impediment reason, or if there is no such permanent reason, the combustion engine is shut off in a method according to the invention, or it is at least shut off with a time delay.

The foregoing disclosure has been set forth merely to illustrate the embodiments of the invention and is not intended to be limiting. Since modifications of the disclosed embodiments incorporating the spirit and substance of the embodiments of the invention may occur to persons skilled in the art, the embodiments of the invention should be construed to include everything within the scope of the appended claims and equivalents thereof.

What is claimed is:

1. An operating method for a hybrid vehicle comprising at least two drive engines, of which the first drive engine is a combustion engine with internal combustion and can be supplied with fuel from a first energy storage device, and a second drive engine, which can be supplied with energy from a second energy storage device, wherein in order to determine a control command with which the first drive engine can be shut off the method comprises the acts of:
    determining a state value for the filling degree of the first energy storage device;
    detecting a filling degree of the second energy storage device;
    comparing said state value for the filling degree of at least the first energy storage device to a target state value; and
    depending on said comparison, determining a control command for the first drive engine, wherein
        the control command for the first drive engine is a control parameter that causes the operation of the first drive engine to be turned off instantly based only on said comparison.

2. The method according to claim 1, wherein the state value for the filling degree of at least the first energy storage device is also determined based on at least one parameter selected from a group of parameters comprising: a tank filling level; a current drive state parameter, in particular a longitudinal and transverse tilt, longitudinal and transverse acceleration, vehicle speed; a temperature in the first energy storage device or ambient temperature; a displayed remaining range, in particular based on the energy content in the first energy storage device; a fuel delivery parameter, in particular pressure, flow velocity or acoustics at least in one section of the fuel delivery system of the first energy storage device; and chronological parameters, in particular time since start of drive.

3. The method according to claim 2, wherein
    at least a first and at least a second state value for the filling degree of at least the first energy storage device is determined, and
    that said individual state values are compared to the target values for said state values.

4. The method according to claim 3, wherein a priority parameter is determined or a shutoff impediment reason can be specified, which can prevent the shutoff of the first drive engine.

5. The method according to claim 4, wherein the priority parameter is selected from a group of parameters that comprises at least the following parameters: driving requirements; vehicle control parameters, in particular such as those that can be derived from automated start-stop processes; and parameters from driver assistance systems.

6. The method according to claim 5, wherein the state value for the filling degree of at least the first energy storage device is stored in a non-volatile memory when the motor vehicle is shut off.

7. The method according to claim 6, wherein said stored state value for the filling degree of at least the first energy storage device is prioritized for some time when the motor vehicle is started again, and that said time is selected from a certain range; that said range is greater than 1 millisecond (ms), preferably greater than 50 ms and preferably greater than 100 ms and furthermore that this range is smaller than 2000 ms, preferably smaller than 1500 ms and especially preferably smaller than 1000 ms, very especially preferably said range is at least about 500 ms.

8. The method according to claim 1, wherein the state value for the filling degree of at least the first energy storage device is also determined based on the following parameters: a tank filling level; a current drive state parameter, in particular a longitudinal and transverse tilt, longitudinal and transverse acceleration, vehicle speed; a temperature in the first energy storage device or ambient temperature; a displayed remaining range, in particular based on the energy content in the first energy storage device; a fuel delivery parameter, in particular pressure, flow velocity or acoustics at least in one section of the fuel delivery system of the first energy storage device; and chronological parameters, in particular time since start of drive.

9. The method according to claim 6, wherein said stored state value for the filling degree of at least the first energy storage device is prioritized for some time when the motor vehicle is started again, and that said time is selected from a certain range, said certain range being:
  greater than 100 ms, and
  smaller than 1000 ms.

10. The method according to claim 1, further comprising:
  disabling shut off of the first drive engine when an accelerator pedal of the hybrid vehicle is depressed near 100%.

11. The method according to claim 1, wherein the control command is determined only when at least two or more state values for the filling degree of the first energy storage device derived therefrom advise shutting off the first drive engine.

* * * * *